(12) United States Patent
Samuel et al.

(10) Patent No.: US 7,537,859 B2
(45) Date of Patent: May 26, 2009

(54) REDOX FLOW BATTERY

(75) Inventors: John Michael Glen Samuel, Surrey (GB); Peter John Ridley, Hampshire (GB)

(73) Assignee: E-Fuel Technology Ltd., Overmoor, Neston, Corsham, Wiltshire (GB)

( * ) Notice: Subject to any disclaimer, the term of this patent is extended or adjusted under 35 U.S.C. 154(b) by 670 days.

(21) Appl. No.: 10/504,721

(22) PCT Filed: Feb. 13, 2003

(86) PCT No.: PCT/GB03/00658

§ 371 (c)(1), (2), (4) Date: Mar. 14, 2005

(87) PCT Pub. No.: WO03/069692

PCT Pub. Date: Aug. 21, 2003

(65) Prior Publication Data

US 2005/0158615 A1    Jul. 21, 2005

(30) Foreign Application Priority Data

Feb. 14, 2002    (GB) ................................ 0203508.7

(51) Int. Cl.
  *H01M 4/36*    (2006.01)
  *H01M 2/38*    (2006.01)
(52) U.S. Cl. .................... 429/101; 429/105; 429/51
(58) Field of Classification Search .......... 137/625.21, 137/625.15, 625.23, 260, 261, 258, 301.17, 137/15.21, 15.22, 100; 429/101, 105
See application file for complete search history.

(56) References Cited

U.S. PATENT DOCUMENTS

| 3,230,975 | A  | * | 1/1966  | Mercier ........................ 138/30 |
| 3,795,544 | A  |   | 3/1974  | Clausi et al. |
| 4,786,567 | A  |   | 11/1988 | Skyllas-Kazacos et al. |
| 5,804,329 | A  |   | 9/1998  | Amendola |
| 6,610,433 | B1 | * | 8/2003  | Herdeg et al. ................. 429/17 |
| 2003/0082427 | A1 | * | 5/2003 | Prasad et al. .................. 429/34 |

FOREIGN PATENT DOCUMENTS

| WO | WO 01/03221    |    | 1/2001 |
| WO | WO 01/83364 A2 | *  | 8/2001 |
| WO | WO 01/76000    |    | 10/2001 |

* cited by examiner

*Primary Examiner*—Dah-Wei D Yuan
*Assistant Examiner*—Maria J Laios
(74) *Attorney, Agent, or Firm*—Alfred A. Fressola; Ware, Fressola, Van Der Sluys & Adolphson LLP (57) ABSTRACT

A redox flow battery 1 has a stack of individual cells, shown diagrammatically as a single cell, with anolyte and catholyte compartments divided from each other by an ionically selective and conductive separator and having respective electrodes. The battery has anolyte and catholyte tanks, with respective pumps and a pipework. In use, the pumps circulate the electrolytes to and from the tanks, to the compartments and back to the tanks. Electricity flows to a load. The electrolyte lines are provided with tappings via which fresh electrolyte can be added and further tappings via which spent electrolyte can be withdrawn, the respective tappings being for anolyte and catholyte. On recharging, typically via a coupling for lines to all the tappings, a remote pump pumps fresh anolyte and fresh catholyte from remote storages and draws spent electrolyte to other remote storages.

23 Claims, 5 Drawing Sheets

REDOX FLOW BATTERY

CROSS-REFERENCE TO RELATED APPLICATIONS

This application is for entry into the U.S. national phase under §371 for International Application No. PCT/GB03/00658 having an international filing date of Feb. 13, 2003, and from which priority is claimed under all applicable sections of Title 35 of the United States Code including, but not limited to, Sections 120, 363 and 365(c), and which in turn claims priority under 35USC §119 to United Kingdom Patent Application No. GB 0203508.7 filed on Feb. 14, 2002.

TECHNICAL FIELD

The present invention relates to a redox flow battery and a method of charging of such a battery.

BACKGROUND OF THE INVENTION

In a fuel cell of a redox flow battery, reagents are passed to opposite sides of an ionically selective and conductive membrane separator separating two reagent compartments, electrodes being provided in the respective compartments. In a redox fuel cell, the reagents are an anolyte and a catholyte. Electricity flows between the reagents via the electrodes, as a result of ionic flow between the reagents through the separator. During discharge, these flows are in one direction and during charging they are reversed. Further, during discharge, the redox ions (not the ions passing through the separator) in the anolyte are oxidised and other redox ions in the catholyte are reduced. During conventional charging, the anolyte ions are reduced and the catholyte ions are oxidised. A small leakage of redox ions may occur through the separator. In the preferred redox flow batteries the redox ions are of the same metal, vanadium, and as such their transfer between electrolytes causes no contamination.

Such a redox flow battery requires reservoirs of the electrolytes and means for supplying them to and from the reagent compartments, e.g. pipes and pumps.

As used in this specification, the term "redox flow battery" is used to mean at least one redox fuel cell per se, together with a pair of electrolyte reservoirs, i.e. one for anolyte and the other for catholyte, and electrolyte supply means, i.e. means for circulating anolyte from its reservoir, to its compartment in the cell and back to the reservoir and like circulating means for catholyte. Usually, the battery will have several cells each supplied with anolyte and catholyte from a single pair of reservoirs.

Conventional charging, by application of a voltage to cause current flow in the reverse direction to that occurring during discharge, is slow, being of the same order of time as that for discharge or taking even longer. This is generally inconvenient for an automobile. Further, facilities for electrical recharging are inconvenient in a car park for instance and the time required for recharging may be insufficient when the automobile has been used to close to the extent of its range and the return journey is required to be made shortly after the outwards journey. It is possible to recharge more quickly, but this involves electric currents and voltages which are undesirably high for a car. Further, in electrically powered commercial vehicles, the time required for conventional recharging drastically reduces the available working time and places severe limitations on the use and applications of electric vehicles operating in a high pressure working environment.

SUMMARY OF THE INVENTION

The object of the present invention is to provide an improved redox flow battery and an improved means of charging a redox flow battery.

According to a first aspect of the invention, there is provided a redox flow battery having connections to its electrolyte reservoirs and/or its electrolyte supply means whereby the battery can be re-charged by withdrawing spent electrolyte and replacing it with fresh electrolyte.

By "spent" electrolyte is intended anolyte in which the redox ions or a significant proportion of them have been oxidised by discharging and catholyte in which the redox ions have been reduced similarly. Similarly, by "fresh" electrolyte is intended anolyte in which the redox ions or the majority of them are in a reduced state and catholyte in which the redox ions or the majority of them are in an oxidised state.

According to another aspect of the invention there is provided a method of re-charging a redox flow battery consisting of withdrawing spent electrolyte from the battery and replacing the spent electrolyte with fresh electrolyte.

Whilst it can be envisaged that the electrolyte exchange could be carried out by withdrawing spent electrolyte from one end of each reservoir and simultaneously introducing fresh electrolyte at the other end; such a system is inefficient in that in order to ensure that all the spent electrolyte is withdrawn, in other words all the "discharged" redox ions are purged from the reservoir, it is necessary to flush the reservoirs with excess fresh electrolyte. This is wasteful of time and fresh electrolyte.

Further it can be envisaged that each reservoir be provided with a diaphragm or other movable closure member such as a piston, whereby withdrawal occurs with traverse of the closure through the reservoir, to a condition in which the reservoir is empty, yet still sealed from the ambient, such sealing being necessary in a redox flow battery cell. Then as a separate subsequent step the fresh electrolyte is introduced, displacing the closure to its "full" position. Alternatively, in a similar arrangement where the reservoirs are emptied before being filled again, that the reservoirs may be collapsible on withdrawal of spent electrolyte and inflatable again on charging with fresh electrolyte.

However, in the preferred arrangement, each reservoir is provided with a movable divider, akin to the movable closure member just mentioned, which divides the reservoir into two volumes. On recharging, the divider traverses along the reservoir with spent electrolyte being withdrawn from in front of the divider and fresh electrolyte being introduced behind it. No communication is allowed between the spent and fresh electrolyte, whereby a complete reservoir full is withdrawn and introduced. For use of the battery, valves are provided for switching after recharging the lines for supplying and returning the electrolyte from and to the appropriate end of the reservoir. When a further recharging is required the introduction and withdrawal is carried out again, but from the opposite ends of the reservoirs. The valves are then switched again. Alternatively, where respective tappings for electrolyte flow are obscured by the diaphragm, no valves are required since pump for the electrolyte flow will draw and return via the tappings which are uncovered.

In the preferred embodiment, a connection with a movable selection member is provided:

the selection member having bores arranged to route a particular line of a complementary refueling connector, i.e. one of the fresh and spent, anolyte and catholyte lines, to a respective port of a selected one of corresponding lines to the connections for withdrawing and replacing electrolyte and the selection member being movable in sequence from:
- a first quiescent position in which all the ports of the corresponding lines are closed off by the selection member to,
- a first connection position in which respective ones of the bores in the selection member are aligned with bores in the selection member for recharging one end of each electrolyte reservoir with fresh electrolyte and for withdrawing electrolyte from the other end of the reservoirs to,
- a second quiescent position in which all the ports of the corresponding lines are closed off by the selection member to,
- a second connection position in which respective ones of the bores in the selection member are aligned with bores in the selection member for recharging the other end of each electrolyte reservoir with fresh electrolyte and for withdrawing electrolyte from the one end of the reservoirs and back to,
- the first quiescent position.

Whilst the selection member can be moved manually as a separate operation after each recharging, it is preferred that it be moved automatically as part of the refueling operation. In the preferred embodiment, the movement is achieved by the acts of connecting and disconnecting the refueling connector. The connection/connector couple are provided with a rotary bayonet fitting, which is engaged by a quarter turn, moving the selection member to one use position, and which is disengaged by another quarter turn. Further the connection/connector couple is arranged to operate as a dry break coupling.

A further feature of the preferred redox flow battery is that it is provided with means for conventional electrical recharging, whereby a car fitted with the battery can be conventionally recharged at home by its owner overnight and recharged in accordance with the invention prior to a return journey, the journey out being close to the limit of the range of the car with the battery of the invention.

BRIEF DESCRIPTION OF THE DRAWINGS

To help understanding of the invention, a specific embodiment thereof will now be described by way of example and with reference to the accompanying drawings, in which.

DETAILED DESCRIPTION

Figure 1:
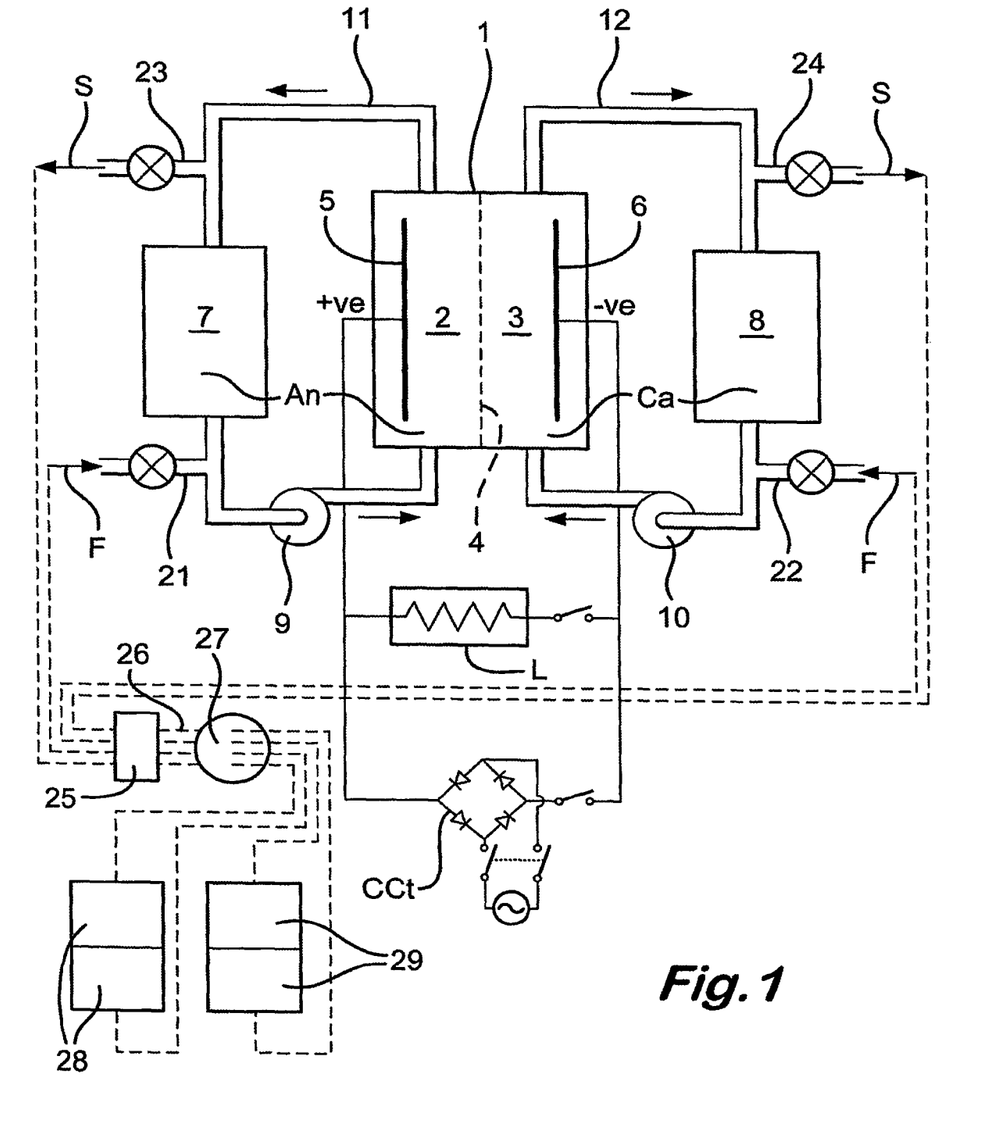
FIG. 1 is a diagram of a redox flow battery according to the invention.

Referring to the drawings, the redox flow battery illustrated in FIG. 1 has a stack of individual cells, shown diagrammatically as a single cell 1, with anolyte and catholyte compartments 2,3 divided from each other by an ionically selective and conductive separator 4 and having respective electrodes 5,6.

The preferred battery uses the Vanadium Redox chemistry described in U.S. Pat. No. 4,786,567, to which the reader is referred for a better understanding. However, the chemistry per se forms no part of the present invention, which is not restricted to Vanadium Redox batteries.

The battery of FIG. 1 has anolyte and catholyte tanks 7,8, with respective pumps 9,10 and a pipework 11,12. In use, the pumps circulate the electrolytes An,Ca to and from the tanks 7,8 to the compartments 2,3 and back to the tanks. Electricity flows to a load L. When the battery is being recharged conventionally, the load is isolated and a charging circuit CCt is switched in. The battery recharges conventionally.

In accordance with the invention, the electrolyte lines are provided with tappings 21,22 via which fresh electrolyte F can be added and further tappings 23,24 via which spent electrolyte S can be withdrawn, the respective tappings being for anolyte and catholyte. On recharging, typically via a coupling 25 for lines 26 to all the tappings, a remote pump 27 pumps fresh anolyte and fresh catholyte from remote storages 28 and draws spent electrolyte to other remote storages 29. This electrolyte is recharged, typically by a conventional fuel cell recharging method, and passed back to the storages 28.

Figure 2:
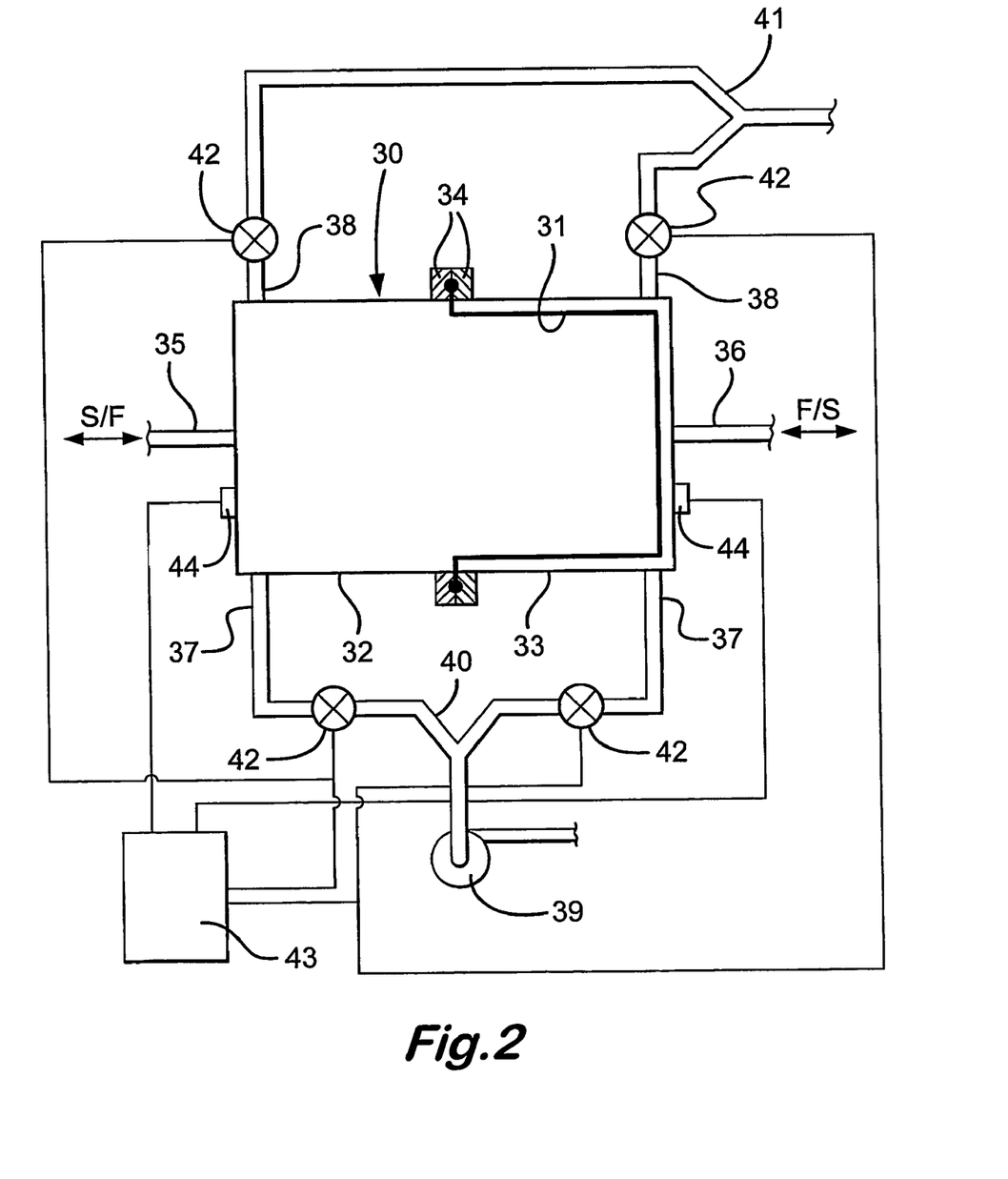
FIG. 2 is a flow diagram of a recharging circuit for an electrolyte tank of the redox flow battery.

In accordance with a preferred feature of the invention each of the anolyte and the catholyte tanks are provided with a movable divider 31 as shown in FIG. 2. Each of the tanks is identical, whereby a single tank 30 only is shown. The divider is a diaphragm clamped between two half tanks 32,33 at flanges 34. The diaphragm is sized so that it can roll from one end of the tank to the other, providing substantially the entire volume of the tank on the respective side of the diaphragm away from the end to which the diaphragm has been rolled.

Each end of the tank has a recharge tapping 35,36, on opposite sides of the diaphragm, through which the fresh electrolyte can be introduced and the spent electrolyte can be withdrawn respectively or vice versa. Further each end has both flow and return tappings 37,38 for supplying electrolyte to the cell stack. A pump 39 is provided for circulating the electrolyte. This is controlled by demand from the battery. As soon as there is a demand, the pump is switched on.

In a simple arrangement, the flow tappings 37 in both ends of the tank are plumbed together at a Y piece 40 and the return tappings, provided on the other side of the tank, are joined by another Y piece 41. The pump is provided downstream of the Y piece 39. It draws electrolyte from whichever of the flow tappings is not covered by the diaphragm having rolled over the other. The return flow is similarly to the same end of the tank.

As shown, the pipes between the tappings and the Y pieces are provided with valves 42, under control of a controller 43. This is connected to transducers 44 in the ends of the tank for detecting the presence of the diaphragm at that end of the tank. The controller opens the valves in the lines to the tappings remote from where the diaphragm is detected and closes the others. Thus the diaphragm's obstruction of half the tappings does not have to be relied upon. Further it is preferred to use the valves to isolate the cell stack from the electrolyte reservoirs during recharging, to avoid pressurising the stack. Recharging is carried out in essentially the same manner as for the FIG. 1 battery.

Turning now to FIGS. 3 to 7, a recharging coupling 125 is there shown; it can be used with either of the battery of FIG. 1 or the battery improved by the modifications of FIG. 2. It has a female connection 151 and a male connector 152. The male connector has a body 153, having four recharging lines 154, respectively for the fresh and spent, anolyte and catholyte. These communicate with respective bores 155 in the body and open in radial ports 156, each having a sealing ring 157 around it. The fresh and return ports for one electrolyte are provided 180° from each other, as are those for the other electrolyte. To provide that the port selector sleeve 170 described below does not have its drillings 171 in communication with ports in the female connection 151, when the latter is not in recharging use i.e. in quiescent state, the two sets of ports in the both parts of the coupling are set at some 75°/105° from each other.

Figure 3:
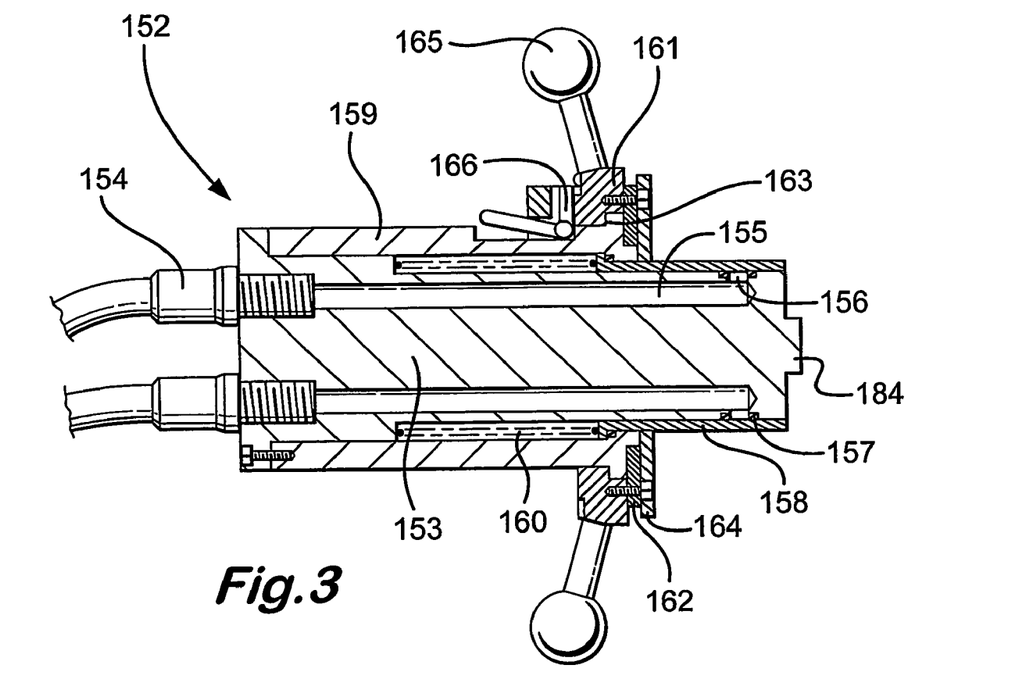
FIG. 3 is a cross-sectional side view of a male connector of a coupling for recharging a battery in accordance with the invention.
Figure 4:
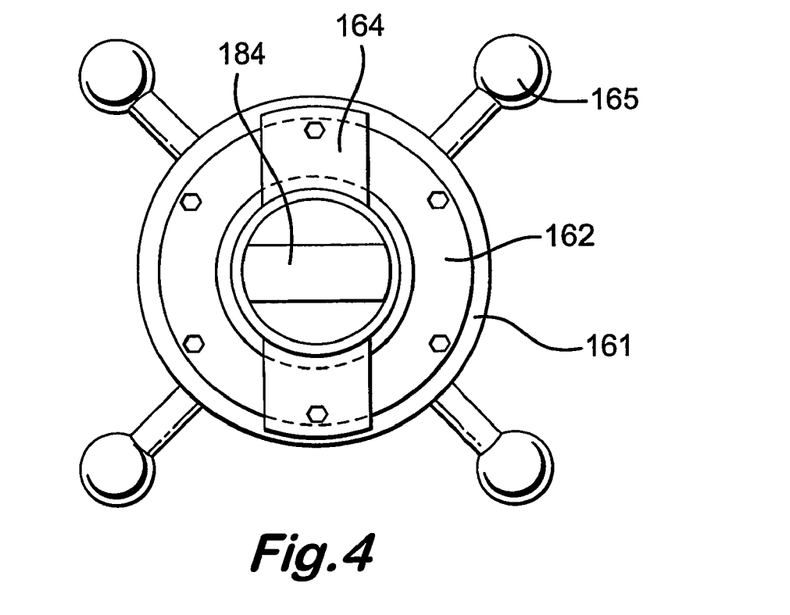
FIG. 4 is an end view of the connector of FIG. 3.

Returning to the male connector, its body has a sliding cover 158 for the bores 155, which it closes in the quiescent state. For use the cover can be slid up within an outer cover 159, against the action of a spring 160. Mounted on the front end of the outer cover is a collar 161, which is rotatable and held on by an annulus 162, captivating a rim 163 on the end of the outer cover. The annulus is bolted to the collar. Also bolted on are a pair of bayonet fitting tongues 164. These components can be rotated as a unit by means of knobs 165. A spring latch 166 acting against ratchet teeth on the collar allows the unit to be rotated clockwise only and drops into deeper recesses (not shown) after 90° of rotation. Further movement requires manual release of the latch.

Figure 5:
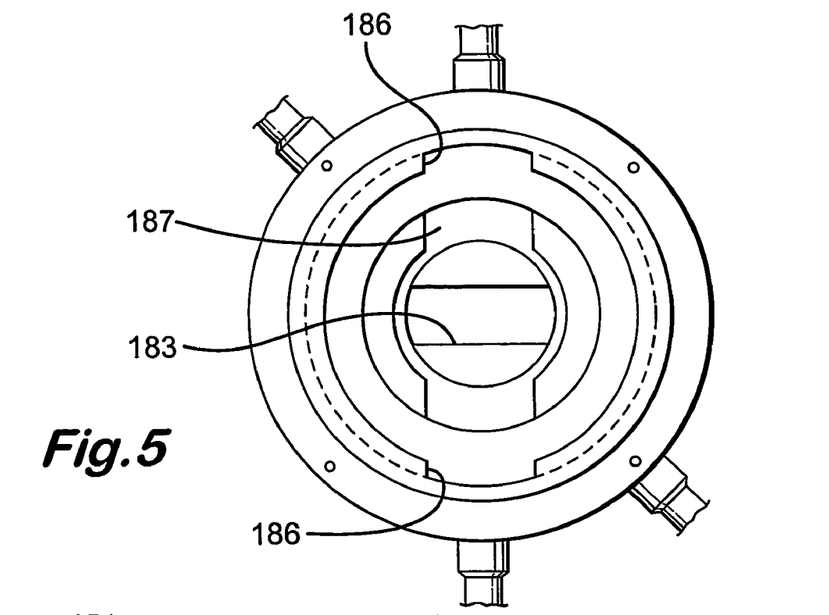
FIG. 5 is an end view of a female connection of the coupling.
Figure 6:
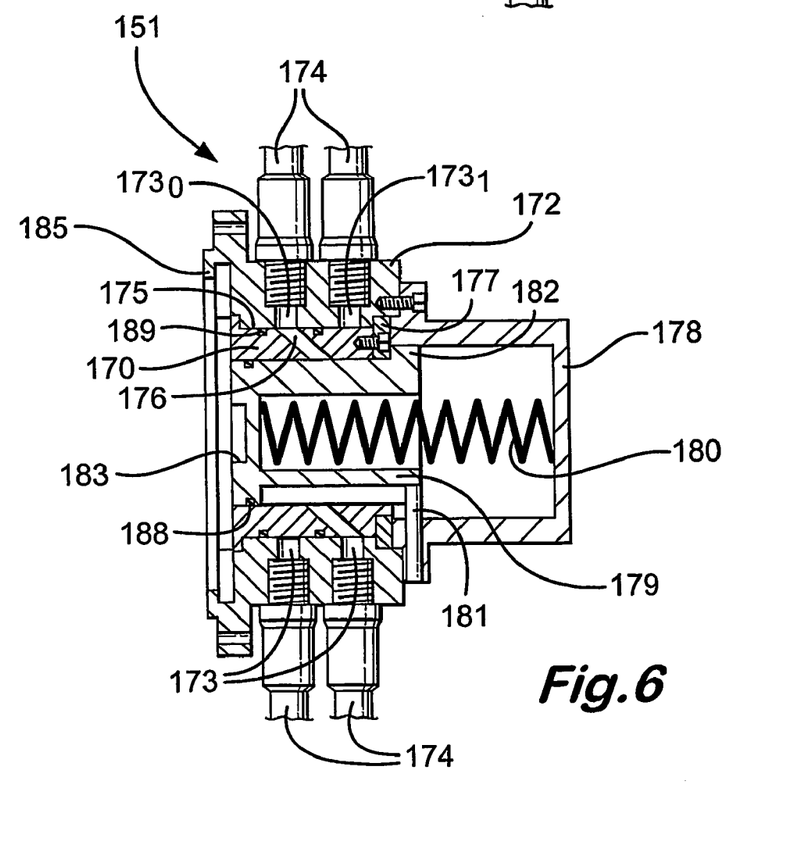
FIG. 6 is a cross-sectional side view of the female connection.

The female connection has a body 172 having eight recharge ports 173 and lines 174, arranged in pairs at the same angular spacing as the ports in 156 in the male connector. In each pair, one line goes to one end of its tank and the other goes to the other end. In other words the lines from the recharge tappings 35,36 branch, one leading to the inner one of the ports $173_I$, on one side and the other leading to the outer one of the ports $173_O$ diametrically on the other side.

Within in the body, sealingly and rotatably fitting in a bore 175 is the port selector sleeve 170. It has angled drillings 176 leading to the inner or outer ports 173 according to its rotational position. The sleeve has an end rim 177 axially captivated by an end cover 178 of the female connection. The latter is of top hat cross-section and irrotationally contains a plunger 179. This is sprung out 180, held from rotation by a pin and slot 181. It is dimensioned to sealingly engage in the port selection sleeve 170. Its inner end has a rim 182, which limits its outwards movement by engagement with the sleeve. The outer end of the plunger has a cross-groove 183, which mates with a protrusion 184 on the end of the male body. Engagement of these determines the correct orientation of the male body. The groove and the protrusion are off-centre to avoid 180° mis-orientation.

The female body has an overhang 185 set out from its bore 175 at its outside. The overhang has diametral cut-outs 186, which accept the bayonet fitting tongues 164. The outer end face of port selection sleeve is also recessed 187 to receive the tongues and be turned by them.

Figure 7:
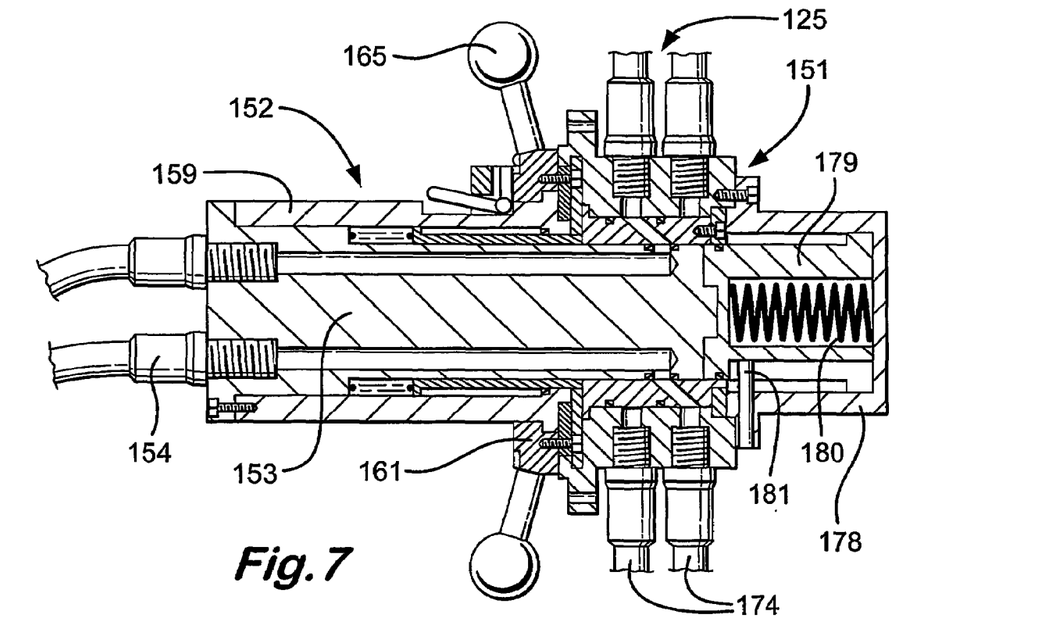
FIG. 7 is a cross-sectional side view of the coupling with the male connector coupled to the female connection

In recharging use, the male connector is offered up to the female connection. The plunger is pushed in and the collar 161 rotated—after initial release of the latch—until it re-engages after 90°. The connection condition is then that one of the ports for each electrolyte is connected to one of the outer ports 173 and the other is connected to the corresponding inner port. Recharging occurs until the exchange of electrolyte is complete. The latch is released to allow another 90° turn of the collar. This releases the male connector. The port selection sleeve has now turned 180° from its initial position, whereby on next use it will be turned 180° from its previous use position. This causes the connections to be reversed end for end to the tank so that the fresh electrolyte is added to the opposite end, and so on for successive rechargings.

The ports 156 in the male body are covered either by its outer cover 159 or the port selection sleeve, whereby no leakage of electrolyte can occur from the ports 156. Similarly the angled drillings 176 in the sleeve are covered either by the plunger, which has a sealing ring 188 or by the male body. Leakage between the sleeve and the female body is inhibited by seals 189. Thus the coupling provides "dry break" connection.

The invention is not intended to be restricted to the details of the above described embodiment. For instance, instead of providing the eight pipes from the female body in pairs which combine at Y pieces, the female body may be provided with drillings from the ports 173 connecting them in pairs, whereby four pipes only need be connected from the female body to the four tappings in the electrolyte tanks. Further separate tappings for the electrolyte recharging and for the electrolyte supply to the stack need not be provided, i.e. the recharging can be carried out via one of the pair of supply tappings in each end of each tank.

Figure 8:
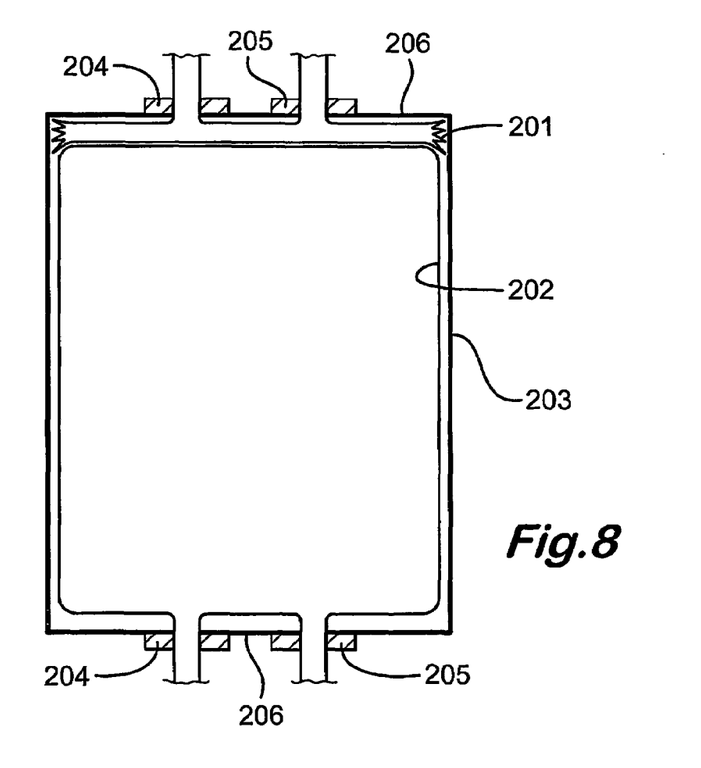
FIG. 8 is a diagrammatic cross-sectional view of another electrolyte tank for a redox flow battery of the invention.

In FIG. 8 is illustrated an alternative to the diaphragm tank of FIG. 2, two separate collapsible tank liners 201,202 being provided within a rigid outer vessel 203. The liners are of polyethylene and each has two unions 203,204. These are fixed in end walls 205 of the vessel 203. One of the unions, in each end is used for recharging in the manner of FIG. 2. On recharging one of the liners collapses as spent electrolyte is withdrawn from it and the other is filled with fresh electrolyte to substantially the internal capacity of the outer vessel. Both unions are used in whichever end is full of electrolyte, for circulation of the electrolyte to the cell stack. It has been noted that the liners roll more uniformly if the tank is oriented with them one above the other.

The invention claimed is:

1. A redox flow battery comprising:
   at least one redox fuel cell, the cell having:
      an anode in a catholyte compartment
      a cathode in an anolyte compartment and
      an ion selective membrane separator between the compartments,
   a pair of electrolyte reservoirs, one for anolyte and the other for catholyte, and
   electrolyte supply means for circulating anolyte from its reservoir, to the anolyte compartment in the cell and back to its reservoir and like circulating means for catholyte
   the battery including:
      connections to its electrolyte reservoirs and/or its electrolyte supply means so that the battery can be recharged by withdrawing spent electrolyte and replacing it with fresh electrolyte,
   further in combination with a recharging electrolyte connection having a movable selection member:
   the selection member having bores arranged to route a particular line of a complementary refueling connector, i.e. one of the fresh and spent, anolyte and catholyte lines, to a respective port of a selected one of corresponding lines to the connections for withdrawing and replacing electrolyte and
   the selection member being movable in sequence from:
      a first quiescent position in which all the ports of the corresponding lines are closed off by the selection member to,
      a first connection position in which respective ones of the bores in the selection member are aligned with bores in the selection member for recharging one end of each electrolyte reservoir with fresh electrolyte and for withdrawing electrolyte from the other end of the reservoirs to, a second quiescent position in which all the ports of the corresponding lines are closed off by the selection member to, a second connection position in which respective ones of the bores in the selection member are aligned with bores in the selection member for recharging the other end of each electrolyte reservoir with fresh electrolyte and for withdrawing electrolyte from the one end of the reservoirs and back to, the first quiescent position.

2. The redox flow battery of claim 1, wherein each
electrolyte reservoir comprises
a movable, electrolyte divider for dividing the reservoir into two volumes, so that for recharging, the movable, electrolyte divider traverses along the reservoir with spent electrolyte being withdrawn from in front of the divider and fresh electrolyte being introduced behind it, with no communication between the spent and fresh electrolyte, and said
connections to the electrolyte reservoirs and/or the electrolyte supply means comprise:
two recharging tappings connected to opposite ends of the reservoirs, on respectively opposite sides of the movable, electrolyte dividers, so that when fresh electrolyte is supplied to the reservoirs at fresh electrolyte volume sides of the movable, electrolyte dividers, the dividers move increasing the fresh electrolyte volumes and reducing the spent electrolyte volumes on the other sides thereof, with the spent electrolyte being flushed from the reservoirs by the fresh electrolyte.

3. A redox flow battery as claimed in claim 2, wherein the movable, electrolyte divider is a diaphragm within the reservoir.

4. A redox flow battery as claimed in claim 2, wherein the movable, electrolyte divider in each reservoir is a piston within the reservoir.

5. A redox flow battery as claimed in claim 2, wherein for each electrolyte reservoir the electrolyte supply means includes a pair of flow tappings and a pair of return tappings, one of each pair being provided at one end of the reservoir for use when the divider is at the other end and the other of each pair being provided at the other end for use when the divider is at the one end.

6. A redox flow battery as claimed in claim 5, wherein the respective flow tappings and return tappings are provided with valves and connected together remote from the reservoir, the valves being provided with control means for opening the supply means to the end of the reservoir having electrolyte via the valves at that end and closing the other valves.

7. A redox flow battery as claimed in claim 2, wherein:
the movable, electrolyte divider in each reservoir is a diaphragm within the reservoir,
for each electrolyte reservoir the electrolyte supply means includes a pair of flow tappings and a pair of return tappings, one of each pair being provided at one end of the reservoir for use when the divider is at the other end and the other of each pair being provided at the other end for use when the divider is at the one end, and
the respective flow tappings and return tappings are arranged to be closed by the diaphragms when at their end of the reservoirs and the pairs of flow and return tappings are connected together without valves.

8. A redox flow battery as claimed in claim 2, wherein one of flow and return tappings in each end of the reservoir is used for electrolyte recharging.

9. A redox flow battery as claimed in claim 2, including means for electrical recharging of the battery.

10. A redox flow battery as claimed in claim 2, wherein each electrolyte reservoir is provided with a rigid outer vessel and two separate, collapsible tank liners,
the liners providing the movable, electrolyte dividers and
the liners having at least two unions passing through the wall of the rigid outer vessel, so that for recharging one of the liners collapses as spent electrolyte is withdrawn from it and the other is filled with fresh electrolyte to substantially the internal capacity of the outer vessel.

11. The combination as claimed in claim 1, wherein the connection and the selection member are adapted for rotary movement between the latter's positions.

12. The combination as claimed in claim 11, in which the selection member is a circularly cylindrical sleeve, having its bores extending from its internal bore to its outside at an angle to a radius from its central axis, the bores being provided in diametrically spaced pairs.

13. The combination as claimed in claim 12, wherein the bores extend at an angle inclined to the central axis, the connection having its ports arranged in pairs, in each of which the two ports are spaced longitudinally with respect to the axis, the arrangement being such that one of the ports in the pairs is in communication with one of the bores in one connection position of the sleeve and the other of the ports is communication with the diametrically opposite bore in the other connection position of the sleeve.

14. The combination as claimed in claim 12, wherein the connection includes a spring loaded plunger sealingly closing a mouth of the sleeve when the connection is not in use and displaceable inwards of the sleeve for recharging use of the connection to expose the bores in the sleeve.

15. The combination as claimed in claim 14, wherein the plunger has a formation in its outer face for recharging alignment of a complementary connector, the plunger being irrotationally mounted in the connection.

16. The combination as claimed in claim 15, wherein the collar is provided with a latch engageable at quarter turns corresponding to the quiescent and connection positions of the port selection sleeve.

17. The combination as claimed in claim 14, the connector having a spring loaded cover on the protrusion, the cover sealingly closing the ports in the protrusion when not in recharging use.

18. The combination as claimed in claim 12, in combination with a complementary recharging connector having a protrusion adapted to be sealingly received inside the sleeve, the connector having diametrically opposed pairs of fresh and spent electrolyte ports in its protrusion.

19. The combination as claimed in claim 18, the connector having a rotatable collar and rotary bayonet fitting tongues fitted to the collar, the tongues being adapted to fit in the bayonet fitting socket and engage with the port selection sleeve for rotation thereof.

20. The combination as claimed in claim 19, wherein the collar is provided with ratchet means, permitting its turning in one direction only on the connector.

21. The combination as claimed in claim 1, wherein the selection member is adapted to be moved manually.

22. The combination as claimed in claim 1, wherein the selection member is adapted to be moved as part of a recharging operation.

23. The combination as claimed in claim 22, wherein the electrolyte connection has a bayonet fitting socket allowing connection at one orientation and disconnection at another orientation after half a turn of a complementary bayonet member, the two orientations corresponding to the quiescent positions, and the movable selection member is adapted to be turned in its sequence by the complementary bayonet member in the connection/disconnection operation.

* * * * *